(12) United States Patent
Glimcher et al.

(10) Patent No.: US 11,281,386 B2
(45) Date of Patent: Mar. 22, 2022

(54) DISK ARRAY ENCLOSURE WITH METADATA JOURNAL

(71) Applicant: EMC IP Holding Company LLC, Hopkinton, MA (US)

(72) Inventors: Boris Glimcher, Bnei Brak (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 16/800,224

(22) Filed: Feb. 25, 2020

(65) Prior Publication Data

US 2021/0263664 A1    Aug. 26, 2021

(51) Int. Cl.
*G06F 11/00* (2006.01)
*G06F 3/06* (2006.01)

(52) U.S. Cl.
CPC .......... *G06F 3/0634* (2013.01); *G06F 3/0619* (2013.01); *G06F 3/0644* (2013.01); *G06F 3/0659* (2013.01); *G06F 3/0673* (2013.01)

(58) Field of Classification Search
CPC .... G06F 3/0644; G06F 3/0619; G06F 3/0659; G06F 3/0673
See application file for complete search history.

(56) References Cited

U.S. PATENT DOCUMENTS

| | | |
|---|---|---|
| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |
| 8,214,612 B1 | 7/2012 | Natanzon |

(Continued)

FOREIGN PATENT DOCUMENTS

| | | |
|---|---|---|
| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — William E. Baughman
*Assistant Examiner* — Janice M. Girouard
(74) *Attorney, Agent, or Firm* — Ryan, Mason & Lewis, LLP

(57) ABSTRACT

A storage system comprises a disk array enclosure comprising an enclosure controller, a cache comprising a metadata journal, a plurality of data storage devices and a plurality of metadata storage devices. The enclosure controller is configured to write a stripe metadata page to the metadata storage devices that corresponds to a stripe of data stored on the data storage devices and to determine that the write of the stripe metadata page failed for a first metadata storage device. The enclosure controller is configured to add an entry to the metadata journal based on the determination that the write failed. The entry comprises an indication of the first metadata storage device and the stripe of data. The enclosure controller is configured to set an indication in a data structure associated with the disk array enclosure that the stripe metadata page has not been written to the first metadata storage device.

20 Claims, 10 Drawing Sheets

(56) References Cited

U.S. PATENT DOCUMENTS

| | | | |
|---|---|---|---|
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0082547 | A1* | 4/2010 | Mace .................. G06F 11/1471 707/648 |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2019/0303490 | A1 | 10/2019 | Chen et al. |
| 2019/0392060 | A1 | 12/2019 | Meiri et al. |
| 2020/0026616 | A1 | 1/2020 | Hu et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. filed Jul. 28, 2017, and entitled "Token-Based Data Flow Control in a Clustered Storage System."

U.S. Appl. No. 15/793,121 filed in the name of David Meiri et al. filed Oct. 25, 2017, and entitled "Opportunistic Compression of Replicated Data in a Content Addressable Storage System."

U.S. Appl. No. 15/824,536 filed in the name of Christopher Sayles et al. filed Nov. 28, 2017, and entitled "Storage System with Asynchronous Messaging between Processing Modules for Data Replication."

U.S. Appl. No. 16/253,793 filed in the name of Yuval Harduf et al. filed Jan. 22, 2019, and entitled "Storage System with Data Consistency Checking in Synchronous Replication Using Active Snapshot Set."

U.S. Appl. No. 16/265,131 filed in the name of Lior Kamran et al. filed Feb. 1, 2019, and entitled "Storage System with Write Cache Release Protection."

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. filed Apr. 29, 2019, and entitled "Storage System with Deduplication-Aware Replication Implemented Using a Standard Storage Command Protocol."

U.S. Appl. No. 16/413,050 filed in the name of Xiangping Chen et al. filed May 15, 2019, and entitled "Storage System with Coordinated Recovery across Multiple Input-Output Journals of Different Types."

U.S. Appl. No. 16/663,524 filed in the name of Xiangping Chen et al. filed Oct. 25, 2019, and entitled "Storage System with Throughput-Based Timing of Synchronous Replication Recovery."

U.S. Appl. No. 16/665,651 filed in the name of Lior Kamran et al. filed Oct. 28, 2019, and entitled "Recovery Flow with Reduced Address Lock Contention in a Content Addressable Storage System."

U.S. Appl. No. 16/166,397 filed in the name of Nimrod Shani et al. filed Oct. 22, 2018 and entitled "Storage System with Data Integrity Verification Performed in Conjunction with Internal Data Movement."

U.S. Appl. No. 16/446,138 filed in the name of William F. Moore et al. filed Jun. 19, 2019 and entitled "Prefill of Raid Stripes in a Storage System by Reading of Existing Data."

U.S. Appl. No. 16/446,161 filed in the name of William F. Moore et al. filed Jun. 19, 2019 and entitled "Automatic Prefill of a Storage System with Conditioning of Raid Stripes."

U.S. Appl. No. 16/446,183 filed in the name of William F. Moore et al. filed Jun. 19, 2019 and entitled "Distributed Generation of Random Data in a Storage System."

U.S. Appl. No. 16/530,121 filed in the name of Anton Kucherov et al. filed Aug. 2, 2019 and entitled "Memory-Efficient Processing of Raid Metadata Bitmaps."

U.S. Appl. No. 16/671,824 filed in the name of Lior Kamran et al. filed Nov. 1, 2019 and entitled "Storage System Capacity Expansion Using Mixed-Capacity Storage Devices."

(56) References Cited

OTHER PUBLICATIONS

U.S. Appl. No. 16/693,858 filed in the name of Doron Tai filed Nov. 25, 2019 and entitled "Storage System with Prioritized RAID Rebuild."

* cited by examiner

DISK ARRAY ENCLOSURE WITH METADATA JOURNAL

FIELD

The field relates generally to information processing systems, and more particularly to storage in information processing systems.

BACKGROUND

In a typical information processing system, host devices interface with a storage system comprising controllers and storage devices to perform data storage related operations. For example, applications executing on the host devices may issue input-output (TO) operations to the storage system which request that data be written to or read from the storage devices. The controllers receive these IO operations and interact with the storage devices to perform the IO operations. The storage controllers then return the results of the IO operations to the host devices.

SUMMARY

In some embodiments, a storage system comprises a disk array enclosure. The disk array enclosure comprises at least one enclosure controller comprising at least one processing device coupled to a memory. The disk array enclosure further comprises a cache comprising a metadata journal and a plurality of data storage devices in communication with the at least one enclosure controller. The disk array enclosure further comprises a plurality of metadata storage devices in communication with the at least one enclosure controller. Each metadata storage device is configured to store metadata corresponding to data stored on the plurality of storage devices. The at least one enclosure controller is configured to write a stripe metadata page to the metadata storage devices. The stripe metadata page corresponds to a stripe of data stored on the plurality of data storage devices of the disk array enclosure. The at least one enclosure controller is further configured to determine that the write of the stripe metadata page failed for a first metadata storage device of the plurality of metadata storage devices and to add an entry to the metadata journal based at least in part on the determination that the write of the stripe metadata page failed. The entry comprises an indication of the first metadata storage device and an indication of the stripe of data. The at least one enclosure controller is further configured to set an indication in a data structure associated with the disk array enclosure that the stripe metadata page for the stripe of data has not been written to the first metadata storage device.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
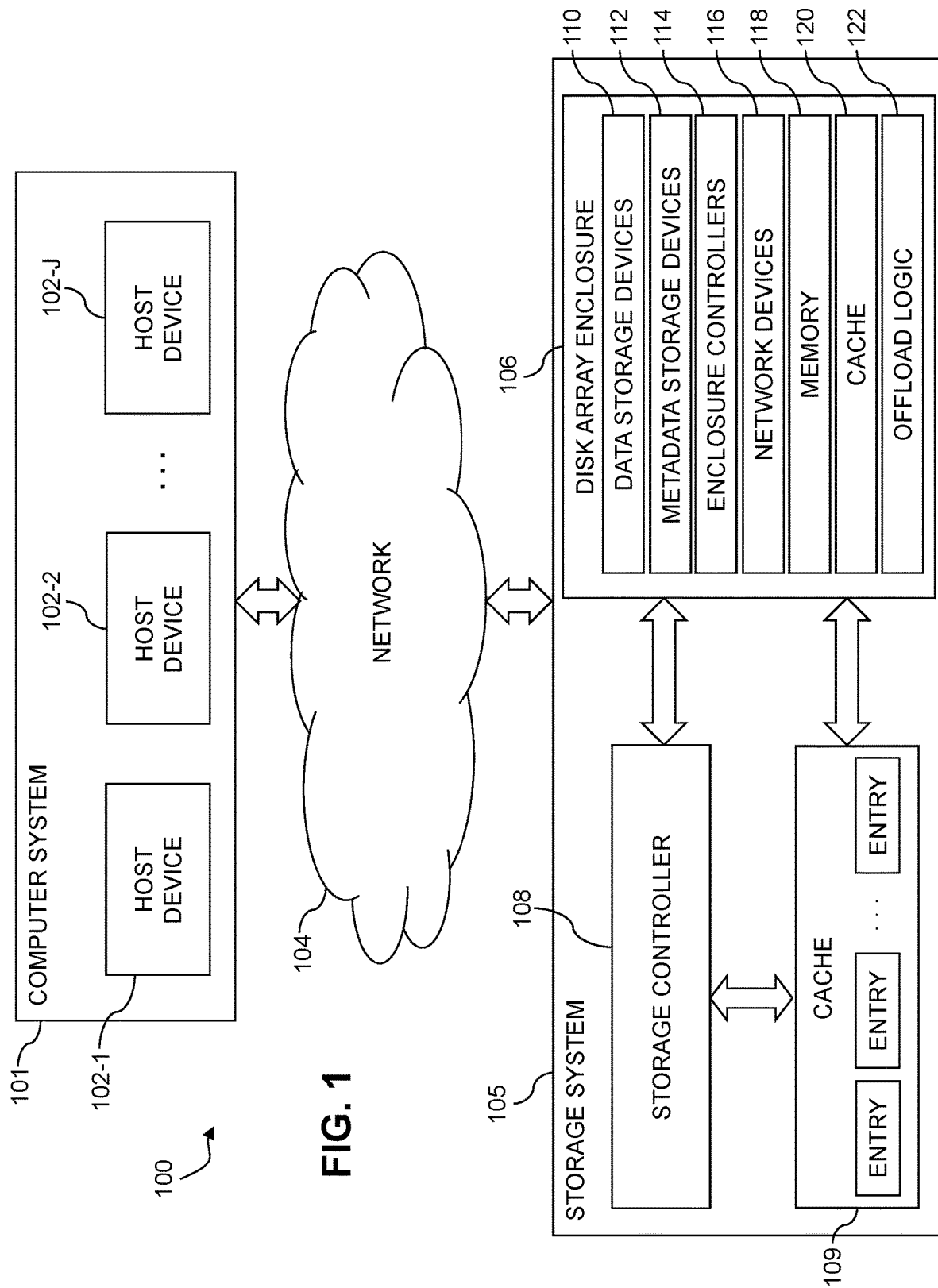
FIG. 1 is a block diagram of one example of an information processing system within which one or more illustrative embodiments are implemented.

FIG. 1 shows an information processing system 100 configured in accordance with an illustrative embodiment. The information processing system 100 comprises a computer system 101 that includes host devices 102-1, 102-2, . . . 102-J collectively referred to as host devices 102. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and the storage system 105 include Google Cloud Platform (GCP) and Microsoft Azure.

The host devices 102 are configured to write data to and read data from the storage system 105. The host devices 102 and the storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with the host devices 102.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet, Fibre Channel, or Non-Volatile Memory express Over Fabrics (NVMeOF). Numerous alternative networking arrangements are possible in a given embodiment, as will be appreciated by those skilled in the art.

The storage system 105 is accessible to the host devices 102 over the network 104. The storage system 105 comprises a disk array enclosure 106, a storage controller 108, and an associated cache 109. In some embodiments, the storage controller 108 and cache 109 may be optional where, for example, the storage system 105 may comprise the disk array enclosure 106 without also comprising the storage controller 108 or cache 109. In some embodiments, more than one disk array enclosure 106, storage controller 108 or cache 109 may be included in storage system 105. The term "disk array enclosure" as used herein is intended to be broadly construed, so as to encompass an enclosure comprising, for example, any form of memory or storage device including, storage class memory, flash drives, solid state drives, hard disk drives, hybrid drives or other types of storage devices.

Figure 2:
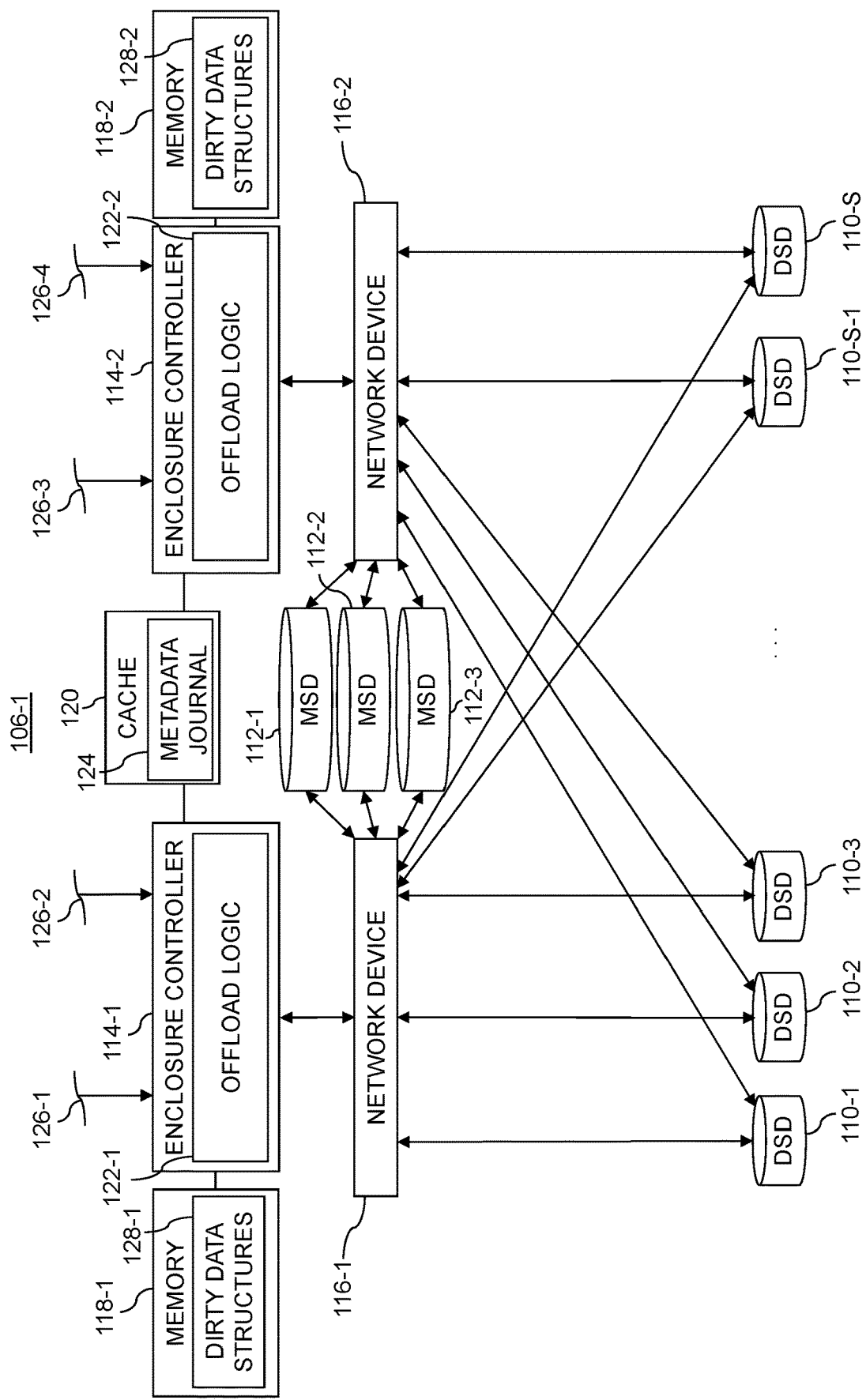
FIG. 2 is a block diagram of an example disk array enclosure of the information processing system of FIG. 1 within which one or more illustrative embodiments are implemented.

With reference to FIGS. 1 and 2, the disk array enclosure 106 illustratively comprises data storage devices 110, metadata storage devices 112, enclosure controllers 114, network devices 116, memory 118, cache 120 and offload logic 122. An example of disk array enclosure 106 is illustrated in FIG. 2.

Data storage devices 110, also referred to in FIG. 2 as DSDs 110-1, 110-2, 110-3 . . . 110-S-1, 110-S, may comprise, for example, solid state drives (SSDs). Such SSDs are implemented using non-volatile memory (NVM) devices such as flash memory. Other types of NVM devices that can be used to implement at least a portion of the data storage devices 110 include non-volatile random-access memory (NVRAM), phase-change RAM (PC-RAM) and magnetic RAM (MRAM). These and various combinations of multiple different types of NVM devices may also be used.

Metadata storage devices 112, also referred to in FIG. 2 as MSDs 112-1, 112-2 and 112-3, may comprise any of the storage devices described above for data storage devices 110. In some embodiments, metadata storage devices 112 may comprise higher grade storage devices than the data storage devices 110. For example, the metadata storage devices 112 may have higher bandwidth and lower latency characteristics than the data storage device 110. In some embodiments, for example, metadata storage devices 112 may comprise storage class memory (SCM) storage devices while the data storage devices 110 may comprise NVM express (NVMe) storage devices or other storage devices that have smaller bandwidth or higher latency than SCM storage devices. In other embodiments, both metadata storage devices 112 and data storage devices 110 may comprise the same class of memory, e.g., SCM, NVMe, etc., with the metadata storage devices 112 having improved bandwidth and latency characteristics as compared to the data storage devices 110. While only three MSDs 112 are illustrated in FIG. 2, any other number of MSDs 112 may be used in other embodiments.

It is to be appreciated that other types of data storage devices 110 and metadata storage devices 112 can be used in other embodiments. For example, a given storage system 105 as the term is broadly used herein can include a combination of different types of data storage devices, as in the case of a multi-tier storage system comprising a flash-based fast tier and a disk-based capacity tier. In such an embodiment, each of the fast tier and the capacity tier of the multi-tier storage system comprises a plurality of data storage devices with different types of data storage devices being used in different ones of the storage tiers. For example, the fast tier may comprise flash drives while the capacity tier comprises hard disk drives. The particular data storage devices used in a given storage tier may be varied in other embodiments, and multiple distinct data storage device types may be used within a single storage tier. Likewise, in some embodiments, a fastest tier of the storage system may comprise the metadata storage devices 112. The terms "storage device" and "disk" as used herein are intended to be broadly construed, so as to encompass, for example, storage class memory, flash drives, solid state drives, hard disk drives, hybrid drives or other types of storage devices.

Enclosure controllers 114, e.g., enclosure controllers 114-1 and 114-2 as shown in the example disk array enclosure 106 of FIG. 2, comprise one or more processing devices such as, e.g., microprocessors, microcontrollers, application-specific integrated circuits (ASICs), field-programmable gate arrays (FPGAs), graphics processing units (GPUs) or other types of processing circuitry, as well as portions or combinations of such circuitry elements. In illustrative embodiments, enclosure controllers 114 are less powerful than storage controller 108. For example, enclosure controllers 114 may comprise less processing power than storage controller 108. In some cases, enclosure controllers 114 may comprise significantly less processing power than storage controllers 108. For example, a given enclosure controller 114 may comprise less than 75%, 50%, 25% or any other percent of the processing power of the storage controller 108.

Enclosure controllers 114 communicate with the rest of the components of storage array 105 or with computer system 101 via one or more connections 126, e.g., connections 126-1, 126-2, 126-3 and 126-4 in the example of FIG. 2. Connections 126 may comprise wired or wireless communication methods and components or any other communication medium which allows the enclosure controllers 114 to communicate with one or more of host devices 102, storage controller 108, cache 109, or any other component of system 100. As an example, in some embodiments, connections 126 may comprise ethernet or other wired connections which each provide at least 50 Gbps of data bandwidth to the enclosure controllers 114. Connections 126 providing a larger or smaller bandwidth than 50 Gbps may also or alternatively be utilized.

Network devices 116, e.g., network devices 116-1 and 116-2 as shown in the example disk array enclosure 106 of FIG. 2, comprise, for example, PCIe switches or other network components that facilitate communication between enclosure controllers 114-1 and 114-2, data storage devices 110-1, 110-2, 110-3 . . . 110-S-1, 110-S, and metadata storage devices 112-1, 112-2 and 112-3.

Memory 118, e.g., memory 118-1 and 118-2 as shown in the example disk array enclosure 106 of FIG. 2, may comprise volatile memory such as, e.g., random access memory (RAM), dynamic random-access memory (DRAM), static random-access memory (SRAM), or any other kind of volatile memory. In some embodiments, memory 118 may additionally or alternatively comprise any non-volatile memory as described above with respect to data storage devices 110. While illustrated as separate components of disk array enclosure 106, in some embodiments, a separate memory 118 may be included as a component of each of the enclosure controllers 114-1 and 114-2

The cache 120 of disk array enclosure 106 comprises a metadata journal 124 which comprises entries associated with failed metadata writes to the metadata storage devices 112 for later hardening to the metadata storage devices 112 of the disk array enclosure 106. In illustrative embodiments, cache 120 comprises persistent memory such as, e.g., any non-volatile memory as described above with respect to data storage devices 110. In other embodiments, cache 120 may illustratively comprise volatile memory such as, e.g., random access memory (RAM), dynamic random-access memory (DRAM), static random-access memory (SRAM), or any other kind of volatile memory. While illustrated as a separate component of disk array enclosure 106, in some embodiments, cache 120 may be included as a component of one or more of the enclosure controllers 114-1 and 114-2.

Storage controller 108 comprises one or more processing devices such as, e.g., microprocessors, microcontrollers, application-specific integrated circuits (ASICs), field-programmable gate arrays (FPGAs), graphics processing units (GPUs) or other types of processing circuitry, as well as portions or combinations of such circuitry elements. As mentioned above, in illustrative embodiments, the storage controller 108 may have a greater processing power than the enclosure controllers 114 of the disk array enclosure 106.

The cache 109 of storage system 105 in the FIG. 1 embodiment includes cache entries which store incoming input-output (10) request data for later destaging to storage devices of the storage enclosures 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to disk array enclosure 106. In some embodiments, cache 109 may support a variety of operations or functions of storage system 105 including, for example, write cache, read cache, or other similar operations. While illustrated as a separate component of storage system 105, in some embodiments, cache 109 may be included as a component of storage controller 108. In some embodiments, where multiple storage controllers 108 each comprising a separate cache 109 are implemented, the caches 109 of the storage controllers 108 may operate together as a single cache 109 where the components of a given storage system 105 may access any portion of the cache 109 including those portions included as components of other portions of storage system 105.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used to implement storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In an illustrative embodiment, as illustrated in FIGS. 1 and 2, the disk array enclosure 106 includes offload logic 122, e.g., offload logic 122-1 and 122-2 as shown in the example disk array enclosure 106 of FIG. 2, which provides logic and functionality for offloading some or all of the RAID processing of data pages from the storage controller 108 to the enclosure controllers 114 of the disk array enclosure 106. The offloading of the RAID processing may comprise, for example, write flow, compression and error offloading. Offload logic 122 also provides logic and functionality for offloading the mapping of logical identifiers, such as, e.g., content-based signatures, to the corresponding physical locations on the data storage devices 110 that store the data associated with the logical identifiers. By offloading this processing functionality to the enclosure controllers 114 of the disk array enclosures 106, the availability of storage controller 108 for servicing additional input-output operations is increased. The offload logic 122 will be described in more detail below.

The host device 102 should also be understood to include additional modules and other components typically found in conventional implementations of computers, servers or other host devices, although such additional modules and other components are omitted from the figure for clarity and simplicity of illustration.

The host device 102 and storage system 105 in the FIG. 1 embodiments are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and at least portions of the storage system 105 are implemented on the same processing platform. The storage system 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage system 105 to reside in different data centers. Numerous other distributed implementations of one or both of the host device 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 8-10.

It is to be appreciated that these and other features of illustrative embodiments are presented by way of example only, and should not be construed as limiting in any way.

Accordingly, different numbers, types and arrangements of system components such as host device 102, network 104, storage system 105, disk array enclosure 106, storage controller 108, cache 109, data storage devices 110, metadata storage devices 112, enclosure controllers 114, network devices 116, memory 118, cache 120 and connections 126 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for offloading using the enclosure controllers 114 will be described below.

Data striping in some embodiments may be implemented on the data storage devices 110 of the disk array enclosure 106 according to a RAID arrangement. In such embodiments, for example, the number of data storage devices in the RAID arrangement may comprise a prime number k, and a column of the RAID arrangement comprises k−1 blocks. In some embodiments, the data storage devices 110 may implement RAID 6 with the number of data storage devices being k and the number of parity data storage devices being n, where n is greater than one (e.g., where n=2). In some embodiments, the stripe column size is selected as a multiple of a designated block size. The multiple may be a prime number P minus 1. The prime number P may be the same as or different than the prime numbers selected for different ones of the stripes.

In some cases, the prime number selected for a particular stripe may be greater than a number of the data storage devices in the storage system that store data blocks for that stripe. To handle such situations, the parity blocks for the stripe may be computed by assuming or setting a set of virtual data storage devices with pages storing designated predetermined values (e.g., zero pages). The particular number of virtual data storage devices in the set may be equal to the difference between the prime number selected for that stripe and the number of data storage devices in the disk array enclosure which store data blocks for that stripe.

The term RAID, as used herein, is an umbrella term for computer data storage schemes that can divide and replicate data among multiple physical data storage devices, in some embodiments referred to also as disk drives. The terms storage devices, disks and drives will be used interchangeably henceforth. The physical disks are said to be in a RAID array, which is accessed by an operating system as one single disk. The different schemes or architectures are named by the word RAID followed by a number (e.g., RAID 0, RAID 1, etc.). Each scheme provides a different balance between the goals of increasing data reliability and increasing input/output performance. While in some embodiments, the storage system is described herein with reference to a RAID array having a RAID 6 scheme, any other RAID scheme may be used in the disclosed embodiments.

The RAID 6 scheme was developed to provide functionality for recovering from a multiple disk failure (e.g., similar to RAID 1.3) with high utilization rates (e.g., comparable to RAID 4 and 5) that avoids system bottlenecks. RAID 6 uses an N+2 parity scheme, which allows failure of two disks, where N is the number of disks in the array. RAID 6 defines block-level striping with double distributed parity and provides fault tolerance of two drive failures, so that the array continues to operate with up to two failed drives, irrespective of which two drives fail.

There are various implementations of RAID 6, which may use varying coding schemes. As the term is used herein, RAID 6 is defined as any N+2 coding scheme which tolerates double disk failure, while user data is kept in the clear. This additional requirement assures that user reads are not affected by the RAID scheme under normal system operation. Examples of RAID 6 schemes include those that utilize the Reed Solomon error correction code and those that utilize parity bits, such as those wherein N data disks are supported by two redundancy disks each holding a different parity bit. It should be noted that if all parity bits are on the same two disks, then the performance may be subject to bottlenecks. This can be solved by use of distributed parity stripes over N+2 disks similar to that specified in RAID 5. Examples of coding schemes based on parity calculations of rows and diagonals in a matrix of blocks include Even/Odd and Row Diagonal Parity (RDP). Both of these schemes utilize a first parity disk "P" that holds the parity information of rows of blocks as well as a second parity disk "Q" that contains blocks that hold the parity information of diagonals of data blocks. In both schemes, it is advantageous to work with a block size that is smaller than the native page size. For example, the native page size may be 8 kilobytes (KB), while the block size is smaller but evenly divisible into 8 KB, e.g., 0.5 KB, 1 KB, 2 KB, 4 KB. In an example where the native page size is 8 KB and the block size is 2 KB, each stripe thus may contain four rows, and thus the four blocks present on each disk form a single native page. However, a stripe can also be defined by multiple rows of blocks distributed across the storage devices of the RAID array. It is assumed that pages are read and written using a single disk operation.

It should be appreciated that there are various other ways to distribute data blocks in an array such as the example RAID array. For example, in some cases it may be desired to provide more than one row parity column, which results in higher capacity overhead but which allows for a faster rebuild after a single disk failure.

Additional details regarding the above-described techniques for storing data in RAID arrays are disclosed in U.S. Pat. No. 9,552,258, entitled "Method and System for Storing Data in RAID Memory Devices," which is incorporated by reference herein.

Figure 3:
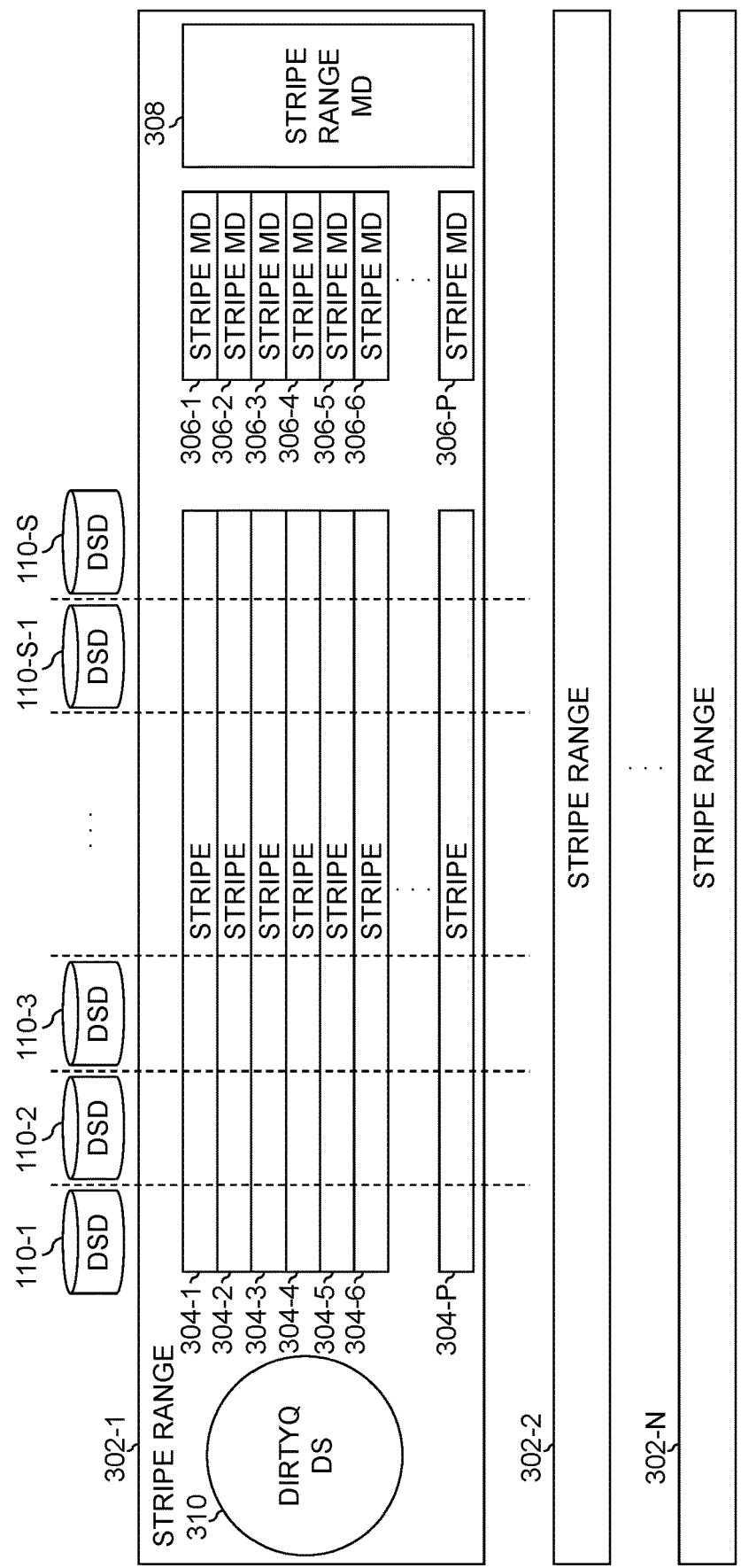
FIG. 3 is a block diagram of one example of a RAID arrangement within which one or more illustrative embodiments are implemented.

FIG. 3 illustrates a representation of an example implementation of a RAID arrangement in the disk array enclosure 106 of FIGS. 1 and 2. The RAID arrangement comprises stripe ranges 302-1, 302-2 . . . 302-N each comprising a plurality of stripes 304-1, 304-2, 304-3, 304-4, 304-5, 304-6 . . . 304-P. The stripes 304 are each divided amongst the DSDs 110-1, 110-2, 110-3 . . . 110-S-1, 110-S. Each stripe 304-1, 304-2, 304-3, 304-4, 304-5, 304-6 . . . 304-P has a corresponding stripe metadata page 306-1, 306-2, 306-3, 306-4, 306-5, 306-6 . . . 306-P which is stored in the metadata storage devices 112. Each stripe range 302-1, 302-2 . . . 302-N also has a corresponding stripe range metadata page 308 stored in the metadata storage devices 112. The stripe range metadata pages 308 may be based at least in part on the stripe metadata pages 306.

Each stripe range 302 also has a corresponding dirtyQ data structure 310, also referred to as dirtyQ DS 310 in FIG. 3. DirtyQ data structure 310 is a data structure stored in memory 118 of the disk array enclosure 106, e.g., in one or both of memory 118-1 and 118-2 in the example disk array enclosure 106 of FIG. 2, and is utilized in conjunction with destage operations to quickly find all data pages for the corresponding stripe range 302. In some embodiments, a single dirtyQ data structure 310 may be stored in the memory 118 and divided into portions associated with each stripe range 302. Each entry in the dirtyQ data structure 310 comprises an indication of an offset into a stripe 304 and is removed after the entire stripe 304 is hardened, e.g., to the data storage devices 110. In the event of corruption, loss of power, or any other issue that impacts the content of the dirtyQ data structure 310, the dirtyQ data structure 310 may be reconstructed from the stripe metadata pages 306, e.g., by scanning through the stripe metadata pages 306.

Modern storage systems leverage flash drives to provide fast reliable de-duplicated compressible in-place-update storage. One of the challenges in such storage systems is lack of true scaling capabilities where computational power and storage capacity are completely independent. For example, many existing systems have a building block which is called a brick that comprises a set number of storage controllers and a set number of capacity entities such as disk array enclosures. Because the storage controllers and capacity entities are tied together, the computing power and storage capacity of such a storage system cannot be independently scaled. For example, a desire to add computing power will result in the addition of capacity even where such capacity is not needed. Likewise, a desire to add capacity will also result in the addition of computing power even where such computing power is not needed.

The disclosed techniques implemented by offload logic 122 of the disk array enclosure 106 provide a scalable and standalone capacity entity with deduplication capabilities, data protection, e.g., RAID, and independent metadata handling with a well-defined key-value store application programming interface (API). For example, the disclosed techniques and disk array enclosure 106 provide complete de-coupling of the storage controller 108, also called a compute node, from the disk array enclosure 106, also called a storage node, which allows for independent scaling of either computing power or capacity.

The offload logic 122 is configured to implement a number of API operations including, for example, a write operation, a read operation, an increment operation, a decrement operation and a fused operation. These operations may be submitted to the offload logic 122 by the storage controller 108 or from the host device 102.

The write operation comprises data to be written to the data storage devices 110 of the disk array enclosure 106. For example, the write operation may comprise a fixed data block of 8K. The enclosure controller 114 will store the data on the data storage devices and return a logical identifier as a response once the data is securely stored and RAID protected on the data storage devices 110. As an example, the logical identifier may comprise a 20B hash key. In some embodiments, the 20B hash key is derived by the enclosure controller 114 from a content of the data. For example, the 20B hash key may comprise a content-based signature generated based on the data. As part of the write operation, offload logic 122 may also compress the data according to one or more RAID operations prior to storage on the data storage devices 110. The enclosure controller 114 may also generate or update metadata in the metadata storage devices 112 corresponding to the logical identifier and the location of the data on the data storage devices 110.

The read operation comprises a logical identifier, e.g., the 20B hash key. The enclosure controller 114 will obtain the data from the data storage devices 110 based at least in part on the logical identifier. For example, the logical identifier may be utilized by the enclosure controller 114 to identify a corresponding metadata page in the metadata storage devices 112 and the location of the data on the data storage devices 110 may be determined based on the metadata page. The enclosure controller 114 may obtain the data from the determined location and return the data, e.g., the 8K data block, as a response to the read operation. Should there be a failure on one or more of the data storage devices 110, enclosure controller 114 may perform one or more RAID operations to restore any missing data. In some embodiments, the enclosure controller 114 may also decompress the data before returning it as a response to the read operation, if necessary.

The increment operation comprises the logical identifier. The enclosure controller 114 increases a reference count in the metadata associated with the data block corresponding to the logical identifier that is stored on the metadata storage devices 112.

The decrement operation comprises the logical identifier. The enclosure controller 114 decreases a reference count in the metadata associated with the data block corresponding to the logical identifier that is stored on the metadata storage devices 112. In the event that the decrement decreases the reference count to a threshold value, e.g., 0, the enclosure controller 114 may designate the data block to be freed up as part of a garbage collection process.

The fused operation comprises a combination of two or more operations. For example, the fused operation may comprise a combination of several of the above operations, e.g., two or more write operations, read operations, increment operations, decrement operations, or any combination thereof. If one or more of the operations included in the fused operation fails, the enclosure controller 114 is configured to return a failure as a response to the fused operation.

The enclosure controller 114 is configured to mirror the metadata, e.g., stripe metadata pages 306 and stripe range metadata pages 308, associated with the data stored on the data storage devices 110 on the metadata storage devices 112 in order to protect the integrity of the metadata. The metadata stored on the metadata storage devices 112 also comprises mappings of the physical locations of the data on the data storage devices 110 to the logical identifier corresponding to that data, e.g., the content-based signature. In some embodiments, each stripe metadata page 306 comprises 4K bytes and represents an entire RAID stripe 304. Each time data needs to be written to or read from the data storage devices 110, or the reference count corresponding to the page needs to be incremented or decremented, the corresponding stripe metadata page is read by the enclosure controller 114 into memory 118. The stripe metadata page 306 is used by the enclosure controller 114 to determine the physical location of the data on the data storage devices 110. Once the physical location has been determined, the enclosure controller may obtain the data from the physical location.

In some embodiments, for example, the capacity of the data storage devices 110 is divided into equal size stripe ranges 302, e.g., at least 256 stripe ranges. Each stripe range 302 has a corresponding stripe range metadata page 308 and is divided into equal size stripes 304, e.g., 64K stripes in a given stripe range 302. Each stripe 304 also has a corresponding stripe metadata page 306. In illustrative embodiments, each stripe 304 is filled with data blocks having different sizes after compression by the enclosure controller 114.

Illustrative embodiments of the techniques and functionality of offload logic 122 will now be described in more detail with reference to FIGS. 4 and 5. The processes of FIGS. 4 and 5 are described with reference also to FIGS. 1-3.

Figure 4:
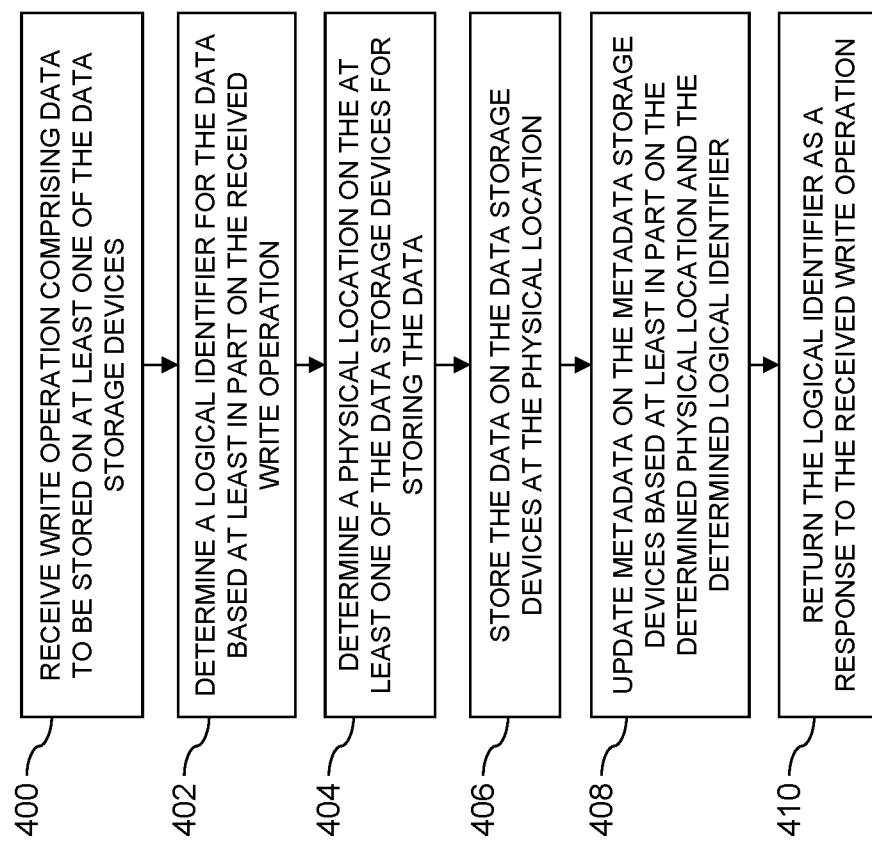
FIG. 4 is a flow diagram illustrating an example technique for offloading of a write operation in an illustrative embodiment.
Figure 5:
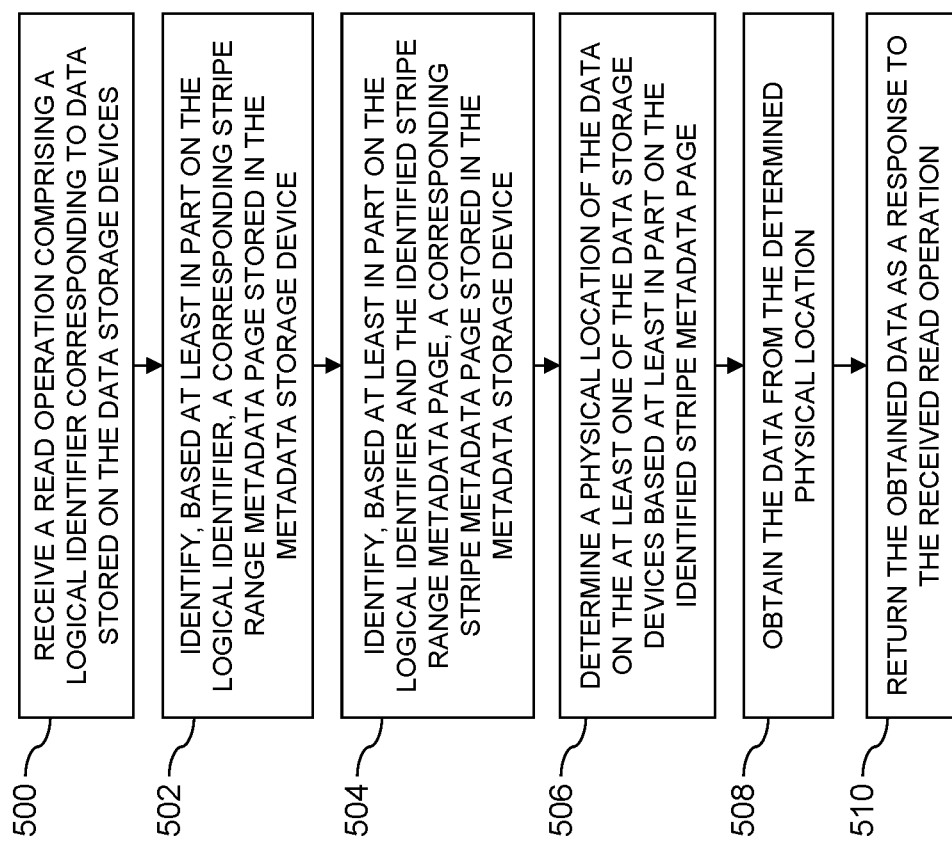
FIG. 5 is a flow diagram illustrating an example technique for offloading of a read operation in an illustrative embodiment.

The process as shown in FIG. 4 includes steps 400 through 410, and is suitable for use in the system 100 but is more generally applicable to other types of systems comprising multiple host devices and a shared storage system. The process of FIG. 4 occurs when a write operation is received by the enclosure controller 114 from a storage controller 108 or host device 102.

At step 400, the offload logic 122 of enclosure controller 114 receives a write operation from the storage controller 108 or the host device 102. For example, storage controller 108 may obtain an IO write operation from the host device, log the IO write operation in a write cache and then destage the write cache to the enclosure controller 114 for hardening to the data storage devices 110. The received write operation comprises data to be written to at least one of the data storage devices 110. For example, the write operation may comprise an 8K block of data to be written to at least one of the data storage devices.

At step 402, offload logic 122 determines a logical identifier for the data based at least in part on the received write operation. For example, a hashing algorithm may be performed on the content of the data to determine a 20B hash value as the logical identifier, e.g., a content-based signature. In some embodiments, the data may be compressed before or after determining the logical identifier.

At step 404, offload logic 122 determines a physical location on at least one of the data storage devices 110 for storing the given data. For example, the determined physical location may comprise the next available physical location in at least one of the data storage devices 110.

At step 406, offload logic 122 stores the data on the data storage devices 110 at the determined physical location.

At step 408, offload logic 122 updates the metadata stored on the at least one metadata storage device based at least in part on the determined physical location and the determined logical identifier. For example, offload logic 122 may access the metadata stored in the metadata storage devices 112 to update a mapping between the determined logical identifier and the corresponding physical location. In some embodiments, for example, offload logic 122 may identify a stripe range metadata page 308 based at least in part on the determined logical identifier. Offload logic 122 may then identify a stripe metadata page 306 based at least in part on the determined logical identifier and the identified stripe range metadata page 308. For example, the stripe metadata page 306 may correspond to an offset into the stripe range metadata page 308. The offset may correspond to a stripe index, e.g., derived from the logical identifier, multiplied by a metadata page size, e.g., 4 KB. Offload logic 122 may then search the identified stripe metadata page for an entry comprising the determined logical identifier and update the entry in the identified stripe metadata page by mapping the determined logical identifier to the determined physical location in the entry. In some embodiments, if no entry comprising the determined logical identifier is present, a new entry comprising the mapping between the determined logical identifier and the determined physical address may be added to the stripe metadata page.

At step 410, the logical identifier is returned as a response to the write operation.

The process as shown in FIG. 5 includes steps 500 through 510, and is suitable for use in the system 100 but is more generally applicable to other types of systems comprising multiple host devices and a shared storage system. The process of FIG. 5 occurs when a read operation is received by the enclosure controller 114 from a storage controller 108 or host device 102.

At step 500, the offload logic 122 of the enclosure controller 114 receives a read operation comprising a logical identifier corresponding to data stored on the data storage devices 110.

At step 502, offload logic 122 identifies, based at least in part on the logical identifier, a corresponding stripe range metadata page 308 stored in the metadata storage device 112. For example, a portion of the logical identifier may correspond to the stripe range metadata page 308.

At step 504, offload logic 122 identifies, based at least in part on the logical identifier and the identified stripe range metadata page 308, a corresponding stripe metadata page 306 stored in the metadata storage device 112. For example, a portion of the logical identifier may correspond to the stripe metadata page 306.

At step 506, offload logic 122 determines the physical location of the data on at least one of the data storage devices 110 based at least in part on the identified stripe metadata page 306. For example, the offload logic 122 may search the identified stripe metadata page 306 for an entry comprising the logical identifier and determine the mapping between the logical identifier and the physical location based at least in part on that entry. If an entry comprising the logical identifier is not included in the stripe metadata page 306, offload logic 122 may return an error or other failure indicating that the data is not available.

At step 508, offload logic 122 obtains the data from the determined physical location.

At step 510, offload logic 122 returns the obtained data as a response to the received read operation.

The use of offload logic 122 to implement RAID and mapping operations within the disk array enclosure 106 instead of on the storage controller 108, as described above, saves a significant amount of bandwidth and processing power as compared to approaches where the RAID operations and mapping are performed entirely or partially by the storage controller 108. In illustrative embodiments, the storage controller 108 need only provide the disk array enclosure 106 with the data to be stored, in the case of a write operation, or the logical identifier corresponding to the data, in the case of a read operation, increment operation or decrement operation. The enclosure controller 114 will then handle all RAID processing such as, e.g., write flow, compression and error handling, and logical identifier to physical location mapping. In addition, by including this functionality within the disk array enclosure 106, the disk array enclosure 106 and the storage controller 108 may be more easily separated for scaling of the compute power or capacity of the storage system without requiring a similar scaling of the other.

Referring again to FIG. 2, in some embodiments, example disk array enclosure 106 comprises three metadata storage devices 112. While only three metadata storage devices 112 are illustrated, example disk array enclosure 106 may comprise any other number of metadata storage devices 112.

In illustrative embodiments, the metadata storage devices 112 are mirrored with the same metadata to provide redundancy. For example, each metadata storage device 112 will have a complete copy, i.e., a mirror, of all of the metadata for the example disk array enclosure 106 in order to provide improved performance, throughput, availability and continuity.

For example, by providing multiple mirrored metadata storage devices 112 in the illustrative embodiments, performance may be improved since each metadata storage device 112 can handle a portion of the incoming read, write or other operations in parallel with the other metadata storage devices 112. For example, if each metadata storage device 112 is capable of servicing 500 KIops worth of read, write or other operations, using all three metadata storage devices 112 at the same time in parallel provides a throughput of 1.5 MIops for the same set of metadata.

In addition, by utilizing multiple metadata storage devices 112, a high level of metadata availability is provided to the disk array enclosure since even if one or more of the metadata storage devices 112 fails or otherwise has its capacity reduced, the other metadata storage devices 112 are still functioning. Should some or all of the metadata storage devices 112 fail at the same time, the metadata may be recovered from a hardened version of the metadata which is stored on the data storage devices 110.

However, a typical three-way mirroring of the metadata storage devices 112 and backup hardening to the data storage devices 110, on its own, may not provide sufficient continuity for recovering from a failure or other issue in all of the metadata storage devices 112 since the metadata associated with pending write and read operations may be lost.

In another case, one or more of the metadata storage devices 112 may occasionally experience a "hiccup," e.g., a scenario where an operation that is submitted to the metadata storage device 112 does not receive a reply for a threshold amount of time. The threshold amount of time after which a submitted operation times out may be defined by the application issuing IO operations from a host device 102, by the operating system of the host device 102 issuing the IO operations, by the HBA drivers or hardware of the host device 102 that are submitting the IO operations, by any component of the storage system 105 or by any other component of the system 100.

When a simple mirroring technique is utilized on the metadata storage devices 112, a metadata page typically will not be written and the corresponding operation cannot be served until all three metadata storage devices 112 finish handling the operation. This situation may cause delays and inconsistent performance during the servicing of IO operations by the disk array enclosure In illustrative embodiments, the metadata storage devices 112 store stripe metadata pages 306 corresponding to stripes of data 304 stored on the data storage devices 110. The stripe metadata pages 306 are written sequentially and referred to by an index and an initial offset. A copy of each metadata page is stored on each of the metadata storage devices 112 and an additional hardened copy is stored on a persistent storage device such as, e.g., the data storage drives 110 or another storage device assigned for that purpose.

The stripe metadata pages 306 may be partitioned in each metadata storage device 112 between each of the enclosure controllers 114. For example, if there are two enclosure controllers 114, half of the stripe metadata pages 306 will be partitioned for servicing by each enclosure controller 114.

The memory 118 associated with each enclosure controller 114 may comprise a plurality of dirty data structures 128, e.g., dirty data structures 128-1 and 128-2 in the example of FIG. 2. For example, the memory 118 of each enclosure controller 114 may comprise a dirty data structure 128 for each of the enclosure controllers 114 included in the disk array enclosure 106. For example, memory 118-1 associated with enclosure controller 114-1 may comprise a pair of dirty data structures 128-1, one for enclosure controller 114-1 and one for enclosure controller 114-2. The dirty data structures 128 are configured to store the logical identifiers associated with failed or timed out metadata write or read operations.

Hiccup and failure management of the metadata storage devices 112 is globally controlled for the entire disk array enclosure 106 since the metadata storage devices 112 are shared by both enclosure controllers 114. For example, management functionality may be implemented within the offload logic 122 of one of the enclosure controllers 114 for monitoring the hiccup and failure status of each of the metadata storage devices 112. For example, the management functionality may monitor each of the metadata storage devices 112 for failures or delayed responses.

The data path of the enclosure controller 114 implementing the management functionality is configured to notify the management functionality about timeout instances associated with each read or write operation submitted to the metadata storage devices 112. For example, the data path may notify the management functionality as each read, write or other operation fails or times out for a given metadata storage device 112, e.g., on demand. In some embodiments, the data path may be configured to notify the management functionality for an aggregate of read and write operation timeouts.

In addition, platform monitoring may also be utilized by the management functionality to determine whether or not there are failures in the metadata storage device 112. For example, the platform monitoring may comprise the use of polling functionality that acts at a slower rate than the on-demand data path notifications. For example, the management functionality may aggregate a threshold number of failure or timeout notifications together, e.g., 5 notifications, 5 notifications in a particular period of time, or any other threshold number or rate of notifications, before determining that a particular metadata storage device 112 is suspicious and moving a state machine for that metadata storage device 112 to a suspected hiccup state. In some example scenarios, this process of monitoring for failures or timeouts, determining that a particular metadata storage device 112 is suspicious, and moving the state machine of the particular metadata storage device 112 to the suspected hiccup state should take less than a threshold amount of time, e.g., a few seconds, minutes, etc., in order not to overflow the buffers. The management functionality is configured to initiate a diagnostic of the suspicious metadata storage device 112 in response to the state machine of the metadata device being moved to the suspected hiccup state.

In some cases, it may be valuable for the management functionality to wait a threshold amount of time, e.g., a few minutes after moving the particular metadata storage device 112 to the suspected hiccup state, prior to initiating the diagnostics in order to allow the metadata storage device 112 to rest. For example, if the failure or timeouts are due to congestion, allowing the metadata storage device 112 to rest while in the suspected hiccup state may allow the congestion to clear out as new read and write operations are directed to the other metadata storage devices 112.

The diagnostics may comprise, for example, submitting dummy read and write operations to the suspicious metadata storage device 112 and determining whether the suspicious metadata storage device 112 is still having issues. For example, if the result of the diagnostics is that the metadata storage device 112 is functioning properly, the state machine of the suspicious metadata storage device 112 may be moved to active, the notifications may be reset, and a counter corresponding to the number of times that the metadata storage device 112 has been deemed suspicious may be incremented to keep track of potential recurrences of the same issues in the future by the metadata storage device 112.

If the result of the diagnostics indicates that the disk is actually in a hiccup state, e.g., timeouts are still present, the management functionality moves the state machine of the metadata storage device 112 to the hiccup state. While in the hiccup state, each write to the metadata storage device 112 is handled as if it has timed out, e.g., adding the write operation to a metadata journal, but not writing the metadata to the metadata storage device 112. In addition, any read operations that are received for the metadata storage device 112 will behave as if there is a metadata journal entry for that read operation and will redirect the read operation to one of the other metadata storage devices 112.

If the result of the diagnostic indicates that the metadata storage device 112 has failed, an alert or notification is issued to the enclosure controllers 114 with instructions to stop using the failed metadata storage device 112.

In some cases, as an optimization, if a threshold period of time has elapsed since the metadata storage device 112 failed and the metadata storage device 112 has not yet been replaced, management functionality may attempt to revive the metadata storage device 112. For example, the management functionality may reset the metadata storage device 112, reformat the metadata storage device 112, power cycle the metadata storage device 112, or perform any other management function on the metadata storage device 112 in an attempt to revive the metadata storage device 112 back into functional use.

The duration that the state machine of the metadata storage device 112 remains in the hiccup state may be determined by the management functionality, for example, based on a predefined timeout value, by querying an internal drive API of the metadata storage device 112, if available, or in any other manner. If the metadata storage device 112 is deemed healthy, the state machine is moved to the active state, and the management functionality may issue a command to resynchronize the metadata storage device 112 with the remaining metadata storage devices 112 as part of a background process.

In some cases, if a metadata storage device 112 was declared as suspicious, e.g., by incrementing the counter, more than a threshold number of times, e.g., 5 times, in the past threshold amount of time, e.g., 5 minutes, the management functionality may attempt to revive the metadata storage device 112, for example, by performing a warm or cold reset of the metadata storage device 112, PCIe ports, or other hardware and running the diagnostic again.

While the management functionality of the offload logic 122 of the enclosure controller 114 handles the timeout and failure of the metadata storage device 112, new write, read or other operations continue to be issued for the other metadata storage devices 112. In order to manage these operations while a drive is in the suspected hiccup state or in the hiccup state, a journaling mechanism may be utilized. For example, a metadata journal 124 which is stored in the cache 120 of the disk array enclosure 106 may be utilized by the enclosure controller 114 to handle write, read and other operations that require servicing while a particular metadata storage device 112 is in the suspected hiccup state or hiccup state. In some embodiments, the cache 120 may comprise persistent memory which stores the metadata journal 124.

An example flow will now be described for when a stripe metadata page 306 is being updated by the enclosure controller 114. The enclosure controller 114 may attempt to update a stripe metadata page 306 in a number of different scenarios.

For example, if the storage controller 108 is destaging the cache 109, e.g., write cache, to the disk array enclosure 106 for storage on the data storage devices 110, stripe metadata pages 306 associated with the destaged data may need to be updated by the enclosure controller 114.

In another scenario, when the stripe metadata pages 306 themselves are destaged for hardening in the data storages devices 110 as a backup copy, corresponding stripe metadata pages 306 may also need to be updated accordingly.

In yet another scenario, when a write operation includes duplicate data, e.g., the logical identifier generated based on the data matches a logical identifier in the metadata storage devices 112 which is already mapped to a physical location, a reference count for that data page may be incremented in the metadata storage devices 112. Likewise, in the case where the data that was stored on the data storage devices 110 has changed or is no longer needed by a particular application, a reference count associated with the data in the metadata storage devices 112 may be decremented which requires an update to the corresponding stripe metadata page 306.

During an update of a given stripe metadata page 306, enclosure controller 114 may attempt to write the stripe metadata page 306 to each of the metadata storage devices 112. If all of the metadata storage devices 112 fail the write, an error code may be returned to the storage controller 108 or host device 102 by the enclosure controller 114.

In addition, for each failed write operation, the management functionality may be notified, e.g., asynchronously after the response is provided to the storage controller 108 or host device 102. The failure may be journaled in the metadata journal 124 by adding an entry comprising a device identifier for the failed metadata storage device 112 and a metadata identifier corresponding to the location of the stripe metadata page 306 in the metadata storage device 112. The dirty data structures 128 of each enclosure controller 114 that correspond to the stripe metadata page 306 of the failed metadata storage device 112, depending on how the stripe metadata pages 306 were partitioned between the enclosure controllers 114, may be updated to add an entry corresponding to the logical identifier of the failed write operation. The dirty data structure 128, metadata journal 124, or another portion of enclosure controller 114 may set an indication that a hardening of the stripe metadata page 306 to the failed metadata storage device 112 is required in the future.

For each successful write operation, the enclosure controller 114 determines whether or not an entry already exists in the metadata journal 124 for the corresponding logical identifier. If such an entry exists, enclosure controller 114 invalidates the entry and updates the dirty data structure 128 to remove the logical identifier from the list of stripes metadata pages 306 to be hardened.

For read operations, each thread of the enclosure controller 114 will utilize a different metadata storage device 112 from which to read the stripe metadata pages 306. This allows reads to exhibit improved performance. Initially, the thread of the enclosure controller 114 that is handling the read operation for a particular metadata storage device 112 will query the dirty data structure 128 associated with the particular metadata storage device 112 to determine whether or not the logical identifier associated with the read operation, e.g., provided as part of the read operation, is included in the dirty data structure 128 associated with the particular metadata storage device 112. For example, the query may determine whether or not the particular metadata storage device 112 holds the latest data for this read operation. If the logical identifier is included in the dirty data structure 128, the enclosure controller 114 will instead attempt the read operation on one of the other metadata storage devices 112.

In the case that none of the metadata storage devices 112 are healthy or have the latest data for the read operation, a copy of the corresponding stripe metadata page 306 is read from the hardened copy stored in the data storage devices 110. In some embodiments, in the case that the particular metadata storage device 112 was moved from the hiccup state or suspected hiccup state to the active state and the stripe metadata page 306 is read from the hardened copy stored in the data storage devices 110 or from one of the other metadata storage devices 112, enclosure controller 114 may take advantage of the read of the stripe metadata page 306 and resync the stripe metadata page 306 to the particular metadata storage device 114, e.g., by updating the corresponding stripe metadata page 306 in the particular metadata storage device 112.

Upon a failover of one of the enclosure controllers 114, e.g., enclosure controller 114-1, the neighboring enclosure controller 114, e.g., enclosure controller 114-2 will take over responsibility for the stripe metadata pages 306 that were partitioned to that enclosure controller 114-1. In the case of a dual enclosure controller configuration, enclosure controller 114-2 may take over full responsibility for all stripe metadata pages 306 of the metadata storage devices 112. As part of this responsibility, enclosure controller 114-2 is configured to review the metadata journal 124 and reconstruct the dirty data structure 128 corresponding to the failed enclosure controller 114-1. Once the failed enclosure controller 114-1 comes back online, the reconstructed dirty data structure 128 may be cleared out.

When a failed metadata storage device 112 or a metadata storage device 112 that was in the hiccup state has been moved to the active state, a resynchronization flow is initiated. For example, enclosure controller 114 may trigger a resynchronization by activating a background process or thread. The background process reviews the metadata journal 124 to determine whether any entries correspond to the metadata storage device 112 that has been moved back to the active state. If any such entries exist, the corresponding stripe metadata pages 306 are read from another valid version, e.g., as stored on one of the other metadata storage devices 112, or from the hardened copy on the data storage devices 110 if necessary, and written to the metadata storage device 112. The corresponding metadata journal entries are then invalidated since they have been hardened to the metadata storage device 112. In some cases, the resynchronization may also be triggered when the size or number of entries in the metadata journal 124 reaches a threshold value. For example, when the size or number of entries in the metadata journal 124 reaches a certain percentage of a total size or number of entries, the metadata journal 124 may be destaged by synchronizing the metadata storage devices 112 with their corresponding journaled stripe metadata page writes.

Illustrative embodiments of the techniques and functionality of offload logic 122 will now be described in more detail with reference to FIG. 6. The process of FIG. 6 is described with reference also to FIGS. 1-3.

Figure 6:
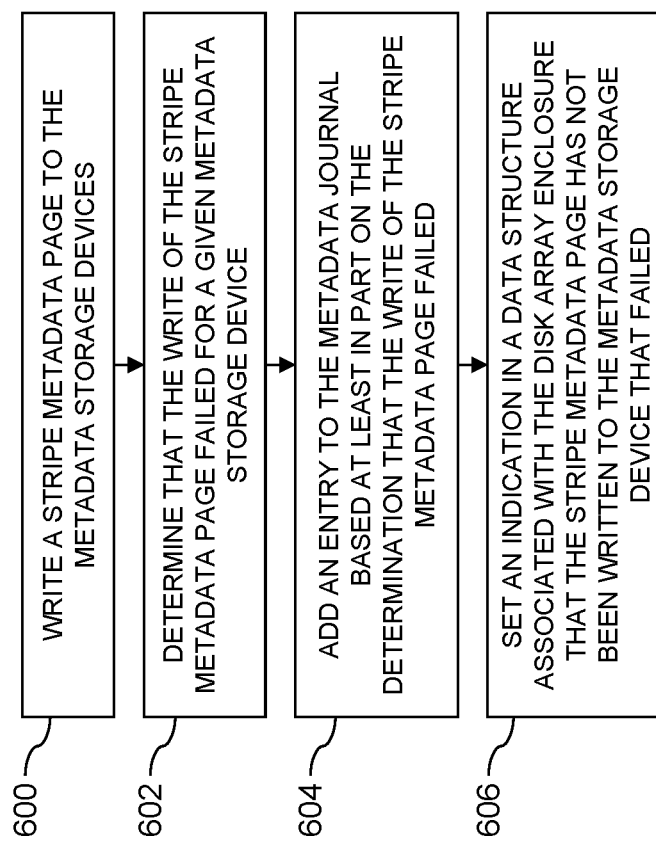
FIG. 6 is a flow diagram illustrating an example technique for offloading metadata storage device management functionality in an illustrative embodiment.

The process as shown in FIG. 6 includes steps 600 through 606, and is suitable for use in the system 100 but is more generally applicable to other types of systems comprising multiple host devices and a shared storage system. The process of FIG. 6 occurs when a write operation is received by the enclosure controller 114 from a storage controller 108 or host device 102.

At step 600, the offload logic 122 of enclosure controller 114 writes a stripe metadata page 306 to the metadata storage devices 112.

At step 602, the offload logic 122 determines that the write failed for one or more of the metadata storage devices 112. For example, the write may fail for metadata storage device 112-1 but succeed for metadata storage devices 112-2 and 112-3.

At step 604, the offload logic 122 adds an entry to the metadata journal 124 based at least in part on the determination that the write to one or more of the metadata storage devices 112, e.g., metadata storage device 112-1, has failed. As mentioned above the entry may comprise a device identifier which identifies the metadata storage device 112 that failed, e.g., metadata storage device 112-1, and a metadata identifier that identifies the particular stripe metadata page that failed to be written.

At step 606, the offload logic sets an indication in a data structure associated with the disk array enclosure 106 that the stripe metadata page 306 has not been written to the metadata storage device 112 that failed, e.g., metadata storage device 112-1, and therefore has not been hardened to the metadata storage device 112 that failed, the data storage devices 110, or both. In some cases, the indication may be set as part of the metadata journal 124. In some cases, the indication may be set as part of the dirty data structure 128 or any other data structure of the disk array enclosure 106.

In some embodiments, the amount of available memory 118 on the disk array enclosure 106 for use by the enclosure controllers 114 is unable to hold all of the stripe metadata pages 306 stored on the metadata storage devices 112. For example, in order to reduce the cost of the processing and memory components of the disk array enclosure 106, components with reduced capabilities may be utilized. This provides some challenges when attempting to efficiently access and utilize the metadata stored in the metadata storage devices 112.

In illustrative embodiments, offload logic 122 implements functionality for improving the speed at which stripe metadata pages 306 are obtained from the metadata storage devices 112.

In a typical read flow, an enclosure controller 114 may receive a read operation from the storage controller 108 or host device 102. The read operation typically comprises a logical identifier such as, e.g., a hash key or content-based signature, that was previously generated by one of the enclosure controllers 114 and provided to the storage controller 108 or host device 102 as a response to a write operation. The enclosure controller 114 then determines a metadata identifier, e.g., stripe index, based at least in part on the logical identifier. For example, a portion of the logical identifier may be utilized by the enclosure controller 114 to identify a corresponding stripe range metadata page 308. A portion of the logical identifier in conjunction with the stripe range metadata page 308 may then be utilized to determine the corresponding metadata identifier.

The metadata identifier, e.g., stripe index, is then used to determine the offset to the corresponding stripe metadata page 306. The stripe metadata page 306 is searched to locate an entry corresponding to the logical identifier. If no entry corresponding to the logical identifier is found, the enclosure controller 114 returns an indication of a failure, e.g., a hash not found response. If an entry corresponding to the logical identifier is found in the stripe metadata page 306, enclosure controller 114 utilizes the entry to obtain the mapping of the logical identifier to the corresponding physical location on the data storage devices 110. The enclosure controller 114 reads the data from the obtained physical location. In a case where the data is compressed, enclosure controller 114 performs one or more RAID operations on the data to decompress the data. If the read or decompression fails, the enclosure controller 114 goes into degraded mode and reclaims the lost data using one or more RAID error recovery processes. If the read or decompression is successful, and enclosure controller 114 obtains the data page corresponding to the read operation, validates the data page, and provides the data page to the storage controller 108 or host device 102 in response to the read operation. In some cases, an RDMA write of the data page to a pre-allocated buff may be utilize for transferring the data page to the storage controller 108 or host device 102 in order to improve performance.

Determining the metadata identifier, e.g., the stripe index, may be a costly and time-consuming process. For example, one approach comprises obtaining the metadata for each stripe 304 in a stripe range 302, e.g., 64 K stripes each having 64 K pages of metadata. For each stripe metadata page 306, each entry is compared to the logical identifier, e.g., 480 entry comparisons. Such a method of determining the stripe index may be very costly in terms of processing power and latency. For example, if the reading and processing of a single stripe metadata page takes roughly 30 μs, the entire search of all of the 64K stripe indices in the stripe range may take about 2 seconds.

Since reading 64K pages of metadata takes too long, a data structure may be employed that will help reduce number of metadata pages to a number of hashes in a hash bucket, e.g., approximately 100 hashes instead of 64K metadata pages. For example, a hash bucket-based data structure may be utilized where each hash bucket may comprise all stripe indices in a given stripe range that contain entries, e.g., logical identifiers. In this manner, only those stripe indices which contain entries need be examined in more detail and the remaining process may be the same as above where, for example, the pages of metadata corresponding to the stripe indices in the bucket will be examined and the corresponding entries compared to the logical identifier. Once the logical identifier is found in one of the stripe metadata pages the mapping to the physical location of the corresponding data may be determined.

In illustrative embodiments, the speed of the search for a given logical identifier in the metadata may be improved through the use of a metadata identifier. In some embodiments, the metadata identifier comprises a hint such as, e.g., the stripe index. In response to a write operation, enclosure controller 114 may be configured to return not only an indication of a successful write, e.g., the logical identifier itself, but also the metadata identifier. For example, the storage controller 108 or host device 102 may receive both the logical identifier and the metadata identifier in response to the submission of a write operation to the enclosure controller 114.

In addition, when a future read operation is submitted to the enclosure controller 114, the read operation may comprise both the logical identifier and the metadata identifier which facilitates faster processing of the read operation.

In illustrative embodiments, enclosure controller 114 comprises an API for servicing read and write operations. For example, the API may function as follows when an operation is received from the storage controller 108 or host device 102.

As an example, when a write operation is received by enclosure controller 114, enclosure controller 114 may perform some or all of the processing described above and then return the logical identifier and the metadata identifier as outputs.

As another example, when a read operation, increment operation or decrement operation is received by enclosure controller 114 that comprises both a logical identifier for the target data page and the metadata identifier, the logical identifier and the metadata identifier may be utilized to locate the metadata page without the searching described above and only the comparison of the logical identifier to the entries in that metadata page need be performed for determining the mapping of the logical identifier to the physical location of the target data. The fused operation may also or alternatively be received. In some embodiments, if the metadata identifier is not included in the operation, the full flow described above may alternatively be utilized to determine the mapping.

An example flow using metadata identifiers will now be described. Initially, enclosure controller 114 obtains a read operation. The read operation comprises both the logical identifier and the metadata identifier. The enclosure controller 114 obtains a stripe index based at least in part on the metadata identifier and obtains the corresponding stripe metadata page, e.g., a 4 KB metadata page. For example, an offset for the stripe metadata page may comprise the stripe index multiplied by the size of the stripe metadata pages.

The logical identifier may then be compared to the entries in the obtained stripe metadata page to determine the mapping between the logical identifier and the physical location of the data on the data storage devices. The remainder of the process may occur as described above including decompressing the page data if needed, recovering the page data if needed, validating the page data, and returning a response comprising the page data. In some embodiments, a RDMA write of the page to a pre-allocated buffer may be utilized to improve performance.

By including the metadata identifiers, e.g., stripe indexes, as part of read, increment, and decrement operations, or returning the metadata identifier as part of the write operation, the read, increment and decrement operations may quickly and efficiently obtain the stripe metadata page comprising an entry corresponding to the logical identifier.

Illustrative embodiments of the techniques and functionality of offload logic 122 will now be described in more detail with reference to FIG. 7. The process of FIG. 7 is described with reference also to FIGS. 1-3.

Figure 7:
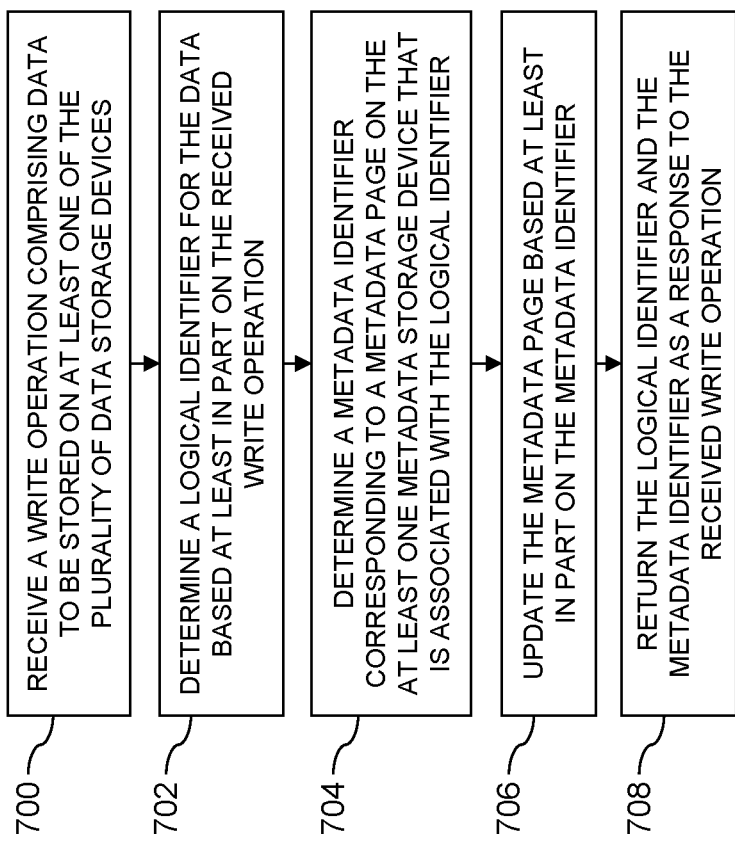
FIG. 7 is a flow diagram illustrating an example technique for offloading in an illustrative embodiment.

The process as shown in FIG. 7 includes steps 700 through 708, and is suitable for use in the system 100 but is more generally applicable to other types of systems comprising multiple host devices and a shared storage system. The process of FIG. 7 occurs when a write operation is received by the enclosure controller 114 from a storage controller 108 or host device 102.

At step 700, enclosure controller 114 receives a write operation comprising data to be stored on at least one of the plurality of data storage devices.

At step 702, enclosure controller 114 determines a logical identifier for the data based at least in part on the received write operation.

At step 704, enclosure controller 114 determines a metadata identifier corresponding to a metadata page on the at least one metadata storage device that is associated with the logical identifier.

At step 706, enclosure controller 114 updates the metadata page based at least in part on the metadata identifier.

At step 708, enclosure controller 114 returns the logical identifier and the metadata identifier as a response to the received write operation.

It is to be understood that the ordering of the process steps of the processes of FIGS. 4-7 may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems or for different RAID arrays or other data striping schemes on a particular storage system or systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, an enclosure controller such as enclosure controller 114 that is configured to control performance of one or more steps of the processes of FIGS. 4-7 described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 of system 100, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate functionality for offloading as disclosed herein.

An illustrative embodiment of such a content addressable storage system will now be described with reference to FIG. 8. In this embodiment, a content addressable storage system 805 comprises one or more compute nodes 815 and one or more capacity nodes 817.

Compute nodes 815 comprise storage controllers 808 and cache 809.

Capacity nodes 817 comprise data storage devices 810, metadata storage devices 812, enclosure controllers 814, network devices 816, memory 818, and cache 820 which are similar to data storage devices 110, metadata storage devices 112, enclosure controllers 114, network devices 116, memory 118 and cache 120, as described above.

The content addressable storage system 805 may be viewed as a particular implementation of the storage system 105, and accordingly is assumed to be coupled to host devices 102 of computer system 101 via network 104 within information processing system 100.

The enclosure controller 814 in the present embodiment is configured to implement offloading functionality of the type previously described in conjunction with FIGS. 1 through 7.

The enclosure controller 814 includes offload logic 822, which is configured to operate in a manner similar to that described above for respective corresponding offload logic 122.

The cache 809 is configured to operate in a manner similar to that described above for cache 109.

Figure 8:
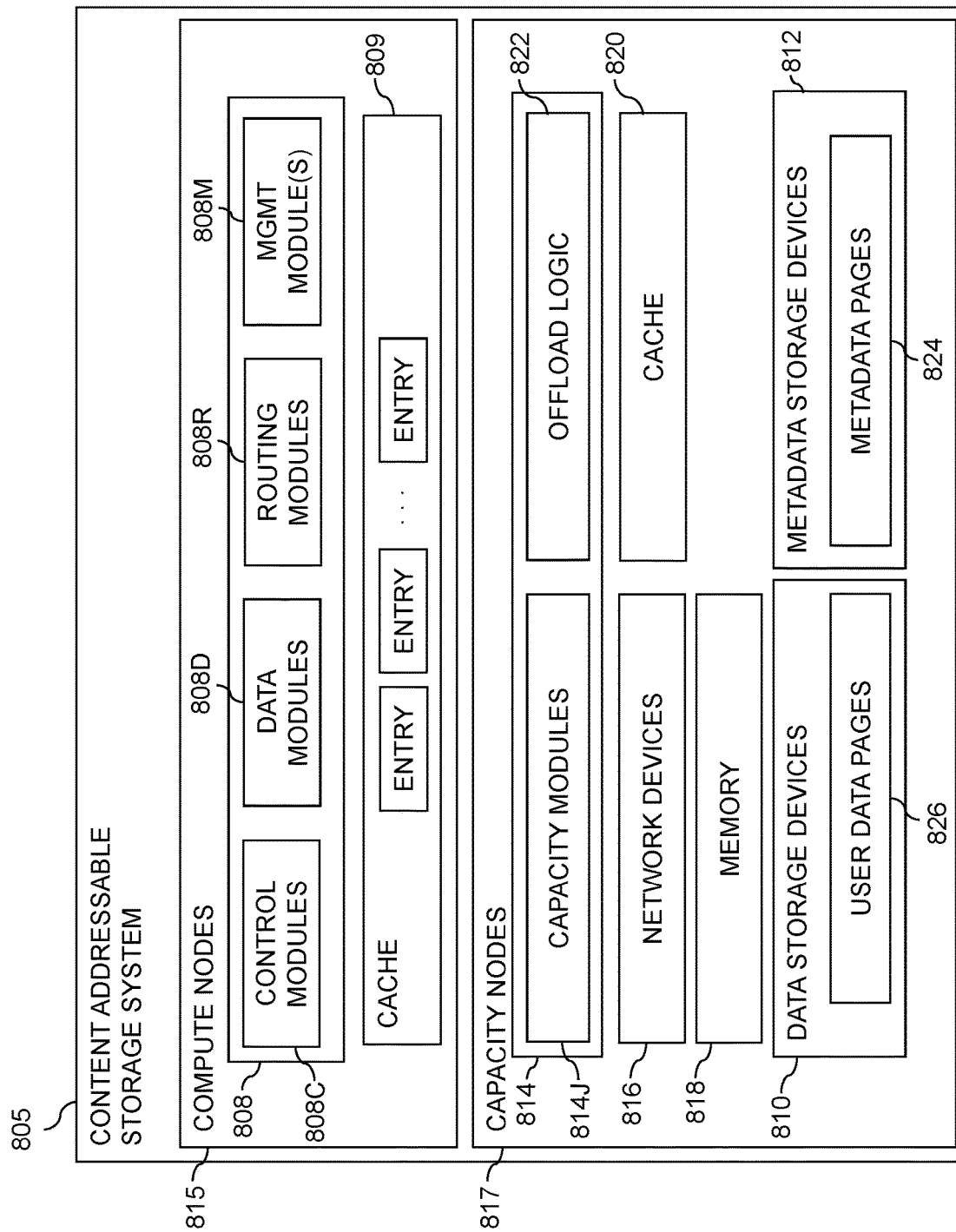
FIG. 8 shows a content addressable storage system configured with functionality for offloading in an illustrative embodiment.

The content addressable storage system 805 in the FIG. 8 embodiment is implemented as at least a portion of a clustered storage system and includes a plurality of compute nodes 815 each comprising a corresponding subset of the storage devices 806. Other clustered storage system arrangements comprising multiple compute nodes can be used in other embodiments. A given clustered storage system may include not only compute nodes 815 but also additional compute nodes coupled via a storage network. Alternatively, such additional compute nodes may be part of another clustered storage system of the system 100. Each of the compute nodes 815 of the storage system 805 is assumed to be implemented using at least one processing device comprising a processor coupled to a memory.

The storage controller 808 of the content addressable storage system 805 is implemented in a distributed manner so as to comprise a plurality of distributed storage controller components implemented on respective ones of the compute nodes 815. The storage controller 808 is therefore an example of what is more generally referred to herein as a "distributed storage controller." In subsequent description herein, the storage controller 808 may be more particularly referred to as a distributed storage controller.

Each of the compute nodes 815 in this embodiment further comprises a set of processing modules configured to communicate over one or more networks with corresponding sets of processing modules on other ones of the compute nodes 815. The sets of processing modules of the compute nodes 815 collectively comprise at least a portion of the distributed storage controller 808 of the content addressable storage system 805.

The modules of the distributed storage controller 808 in the present embodiment more particularly comprise different sets of processing modules implemented on each of the compute nodes 815. The set of processing modules of each of the compute nodes 815 comprises at least a control module 808C, a data module 808D and a routing module 808R. The distributed storage controller 808 further comprises one or more management ("MGMT") modules 808M. For example, only a single one of the compute nodes 815 may include a management module 808M. It is also possible that management modules 808M may be implemented on each of at least a subset of the compute nodes 815.

Each of the compute nodes 815 of the storage system 805 therefore comprises a set of processing modules configured to communicate over one or more networks with corresponding sets of processing modules on other ones of the compute nodes. A given such set of processing modules implemented on a particular storage node illustratively includes at least one control module 808C, at least one data module 808D and at least one routing module 808R, and possibly a management module 808M. These sets of processing modules of the compute nodes collectively comprise at least a portion of the distributed storage controller 808.

Communication links may be established between the various processing modules of the distributed storage controller 808 using well-known communication protocols such as IP, Transmission Control Protocol (TCP), and remote direct memory access (RDMA). For example, respective sets of IP links used in data transfer and corresponding messaging could be associated with respective different ones of the routing modules 808R.

The metadata storage devices 812 are configured to store metadata pages 824 and the data storage devices 810 are configured to store user data pages 826 and may also store additional information not explicitly shown such as checkpoints and write journals. The metadata pages 824 and the user data pages 826 are illustratively stored in respective designated metadata and user data areas of the metadata storage devices 812 and data storage devices 110. Accordingly, metadata pages 824 and user data pages 826 may be viewed as corresponding to respective designated metadata and user data areas of the metadata storage devices 812 and data storage devices 810.

A given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 824 and the user data pages 826.

The user data pages 826 are part of a plurality of logical units (LUNs) configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 826 can include any type of user data that may be utilized in the system 100. The term "user data" herein is therefore also intended to be broadly construed.

The content addressable storage system 805 in the embodiment of FIG. 8 is configured to generate hash metadata providing a mapping between content-based digests of respective ones of the user data pages 826 and corresponding physical locations of those pages in the user data area. Content-based digests generated using hash functions are also referred to herein as "hash digests." The hash metadata generated by the content addressable storage system 805 is illustratively stored as metadata pages 824 in the metadata area. The generation and storage of the hash metadata is assumed to be performed under the control of the enclosure controller 814.

Each of the metadata pages 824 characterizes a plurality of the user data pages 826. For example, a given set of user data pages representing a portion of the user data pages 826 illustratively comprises a plurality of user data pages denoted User Data Page 1, User Data Page 2, . . . User Data Page n. It should be noted that usage of the variable n in this user data page context is unrelated to its usage elsewhere herein.

Each of the user data pages 826 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 810.

Each of the metadata pages 824 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 824 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 805 is illustratively distributed among the control modules 808C.

The management module 808M of the storage controller 808 may include logic that engages corresponding logic instances in all of the control modules 808C and routing modules 808R in order to implement processes associated with the offloading functionality.

In some embodiments, the content addressable storage system 805 comprises an XtremIO™ storage array suitably modified to incorporate techniques for write flow offloading, compression offloading and error offloading, as disclosed herein.

In arrangements of this type, the control modules 808C, data modules 808D and routing modules 808R of the distributed storage controller 808 illustratively comprise respective C-modules, D-modules and R-modules of the XtremIO™ storage array. The one or more management modules 808M of the distributed storage controller 808 in such arrangements illustratively comprise a system-wide management module ("SYM module") of the XtremIO™ storage array, although other types and arrangements of system-wide management modules can be used in other embodiments.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of compute nodes in a clustered storage system implementation.

The distributed storage controller in this example is configured to group consecutive pages into page groups, to arrange the page groups into stripes, to arrange stripes into stripe ranges and to assign the stripes and stripe ranges to different ones of the C-modules. For example, if there are 1024 stripes distributed evenly across the C-modules, and there are a total of 16 C-modules in a given implementation, each of the C-modules "owns" 1024/16=64 stripes. In such arrangements, different ones of the stripes are assigned to different ones of the control modules 808C such that control of the stripes within the storage controller 808 of the storage system 805 is substantially evenly distributed over the control modules 808C of the storage controller 808.

The D-module 808D of the storage controller 808 interfaces with a capacity module 814J of the enclosure controller 814 which allows a user to locate a given user data page based on its signature. For example, the D-module 808D receives instructions from the C-module 808C, e.g., aggregated write cache entries, and determines whether they are write operations, read operations, increment operations, decrement operations or fused operations. The D-module then submits the operation as an API operation to the enclosure controller 814, e.g., to capacity module 814J. The enclosure controller 814 then performs the necessary RAID operations, mapping, etc. to either write or obtain the corresponding data to the data storage devices 810 and to update the corresponding metadata in the metadata storage devices 812 if necessary.

Each metadata page also has a size of 8 KB and includes multiple instances of the <lun_id, offset, signature> for respective ones of a plurality of the user data pages. Such metadata pages are illustratively generated by the capacity module 814J but are accessed by the D-module using the capacity module 814J based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page and submitted to the enclosure controller. The enclosure controller then reads the corresponding metadata page using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module 808D of the storage controller 808 and capacity module 814J. This metadata page will include the <lun_id, offset, signature> for the user data page if the user page exists. The signature of the user data page is then used to retrieve that user data page, also via the D-module and capacity module 814J.

Write requests processed in the content addressable storage system 805 each illustratively comprise one or more IO operations directing that at least one data item of the storage system 805 be written to in a particular manner. A given write request is illustratively received in the storage system 805 from a host device, illustratively one of the host devices 102. In some embodiments, a write request is received in the distributed storage controller 808 of the storage system 805 and directed from one processing module to another processing module of the distributed storage controller 808. For example, a received write request may be directed from a routing module 808R of the distributed storage controller 808 to a particular control module 808C of the distributed storage controller 808. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the compute nodes 815 communicate with one another over a high-speed internal network such as an InfiniBand network. The C-modules, D-modules and R-modules coordinate with one another to accomplish various IO processing tasks.

The write requests from the host devices identify particular data pages to be written in the storage system 805 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 805 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 805.

The first level of mapping using the A2H table associates logical addresses of respective data pages with respective content-based signatures of those data pages. This is also referred to logical layer mapping. In illustrative embodiments, the A2H table and mapping is managed by the storage controller 808.

The second level of mapping using the HMD table associates respective ones of the content-based signatures with respective physical storage locations in one or more of the storage devices 810. This is also referred to as physical layer mapping. In illustrative embodiments, the HMD table and mapping is managed by the enclosure controller 814.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 805 correspond to respective physical blocks of a physical layer of the storage system 805. The user data pages of the logical layer are organized by LBA and have reference via respective content-based signatures to particular physical blocks of the physical layer.

Each of the physical blocks has an associated reference count that is maintained within the storage system 805. For example, the reference counts may be maintained in the metadata storage devices 812. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 808C, 808D, 808R and 808M and enclosure controller capacity module 814J as shown in the FIG. 8 embodiment is presented by way of example only. Numerous alternative arrangements of processing modules of a distributed storage controller and capacity modules of enclosure controllers may be used to implement functionality for offloading processing to a disk array enclosure in a clustered storage system in other embodiments.

Additional examples of content addressable storage functionality implemented in some embodiments by control modules 808C, data modules 808D, routing modules 808R and management module(s) 808M of distributed storage controller 808 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with functionality for offloading can provide a number of significant advantages relative to conventional arrangements. For example, some embodiments provide techniques for offloading that reduce the processing that is required to be performed by the storage controller and reduce the amount of bandwidth usage between the storage controller and the disk array enclosure. These techniques allow the storage controller to free up processing resources and bandwidth for use in servicing additional 10 requests or other system needs while the enclosure controller handles the RAID and mapping tasks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for offloading will now be described in greater detail with reference to FIGS. 9 and 10. Although described in the context of system 100, these platforms may also be used to implement at least portions of other information processing systems in other embodiments.

Figure 9:
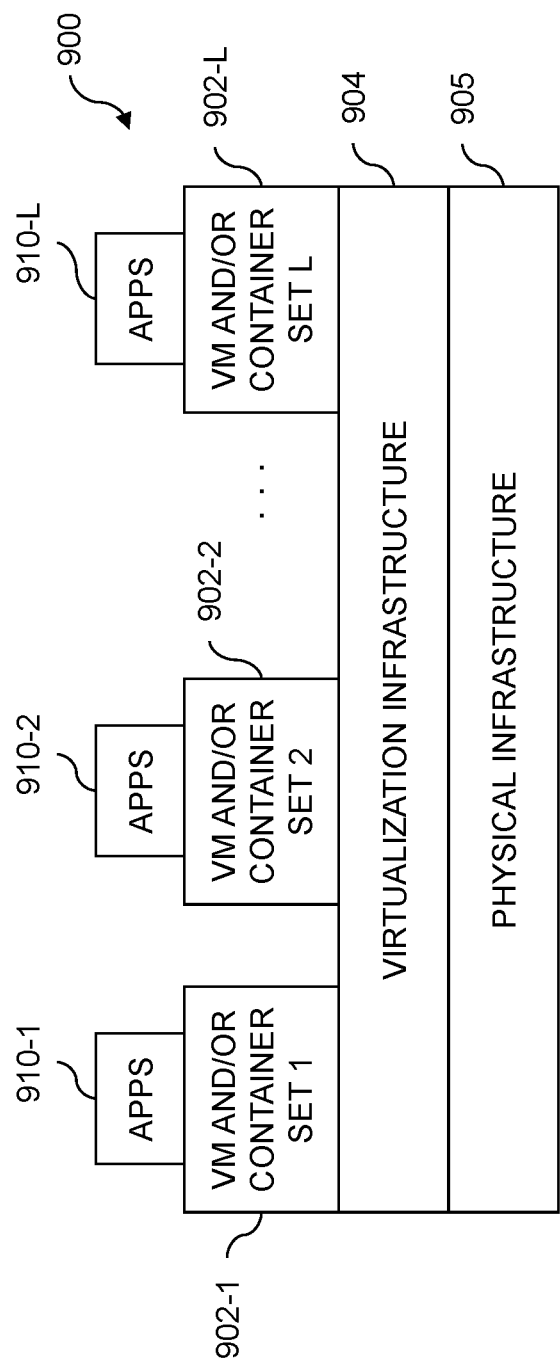
FIGS. 9 and 10 show examples of processing platforms that may be utilized to implement at least a portion of an information processing system in illustrative embodiments.
Figure 10:
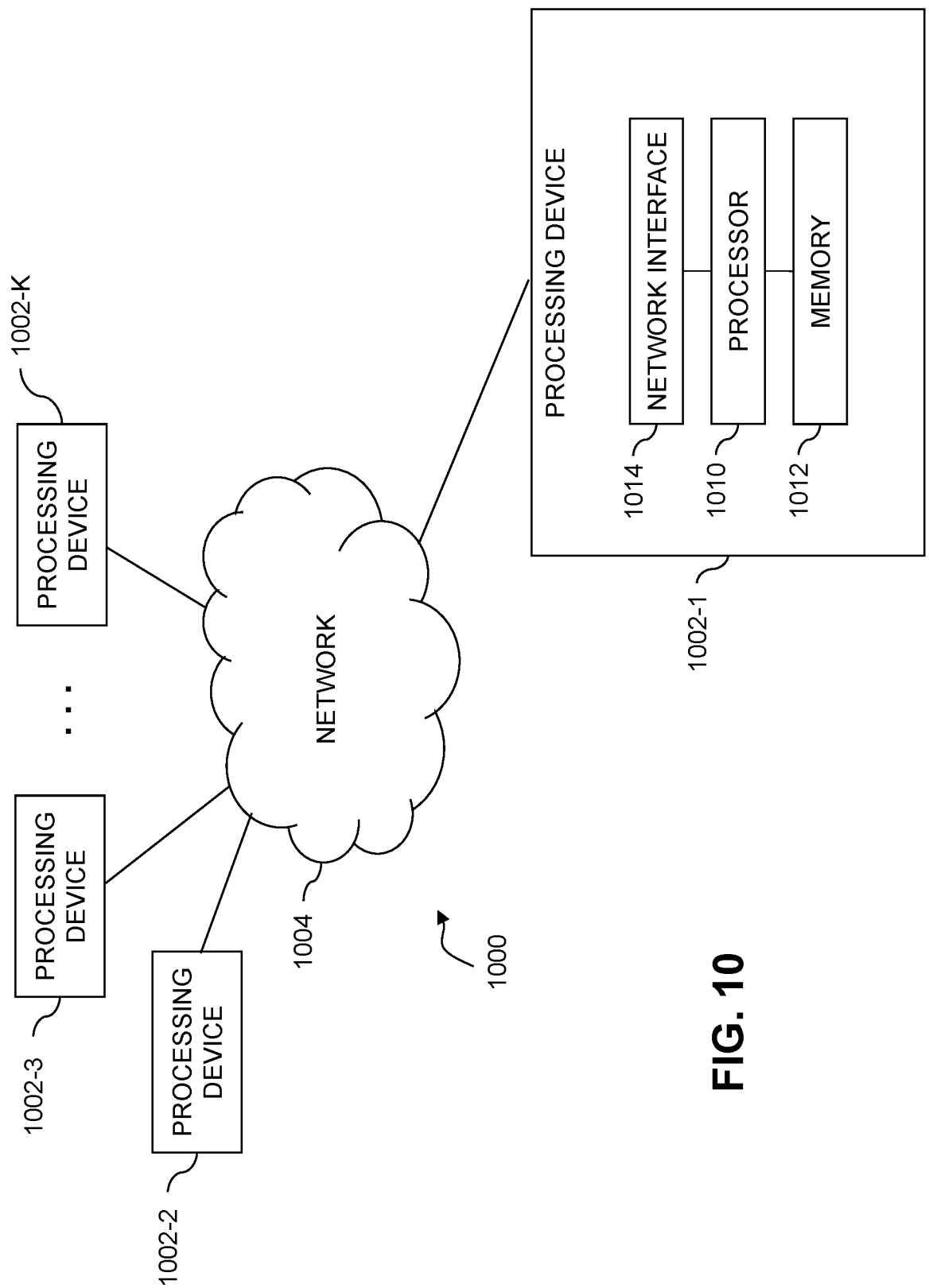

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide functionality for offloading of the type described above for one or more processes running on a given one of the VMs. For example, each of the VMs can implement such functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide functionality for offloading of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for offloading as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, compute nodes, capacity nodes, storage devices, storage controllers, disk array enclosures or enclosure controllers, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a disk array enclosure, the disk array enclosure comprising:
at least one enclosure controller comprising at least one processing device coupled to a memory;
a cache comprising a metadata journal;
a plurality of data storage devices in communication with the at least one enclosure controller; and
a plurality of metadata storage devices in communication with the at least one enclosure controller, each metadata storage device being configured to store metadata corresponding to data stored on the plurality of storage devices;
wherein the at least one enclosure controller is configured:
to write a first stripe metadata page to the metadata storage devices, the first stripe metadata page corresponding to a stripe of data stored on the plurality of data storage devices of the disk array enclosure;
to determine that the write of the first stripe metadata page failed for a first metadata storage device of the plurality of metadata storage devices;
to add an entry to the metadata journal based at least in part on the determination that the write of the first stripe metadata page failed, the entry comprising an indication of the first metadata storage device and an indication of the stripe of data;
to set an indication in a data structure associated with the disk array enclosure that the first stripe metadata page for the stripe of data has not been written to the first metadata storage device; and
to set the first metadata storage device to a hiccup state based at least in part on the determination that the write of the first stripe metadata page failed for the first metadata storage device.

2. The apparatus of claim 1 wherein the at least one enclosure controller is further configured:
to determine that the write of the first stripe metadata page succeeded for a second metadata storage device of the plurality of metadata storage devices;
to determine that the metadata journal comprises an additional entry corresponding to the second metadata storage device, the additional entry comprising an indication of the second metadata storage device and an indication of the stripe of data; and
to invalidate the additional entry in the metadata journal based at least in part on the determination that the write of the first stripe metadata page succeeded for the second metadata storage device.

3. The apparatus of claim 1 wherein the memory comprises a dirty data structure associated with the first metadata storage device, the at least one enclosure controller being further configured to add an entry to the dirty data structure based at least in part on the determination that the write of the first stripe metadata page failed for the first metadata storage device, the entry added to the dirty data structure comprising a logical identifier corresponding to at least a portion of the stripe of data.

4. The apparatus of claim 3 wherein the at least one enclosure controller is further configured:
to receive a read operation comprising the logical identifier;
to determine that the dirty data structure associated with the first metadata storage device comprises the logical identifier; and
to attempt to obtain the first stripe metadata page from another of the plurality of metadata storage devices based at least in part on the determination that the dirty data structure associated with the first metadata storage device comprises the logical identifier.

5. The apparatus of claim 4 wherein:
the memory comprises a plurality of dirty data structures each associated with a corresponding metadata storage device of the plurality of metadata storage devices;
the at least one enclosure controller is further configured:
to maintain a copy of the first stripe metadata page on the plurality of data storage devices;
to determine that each of the dirty data structures comprises the logical identifier; and
to obtain the first stripe metadata page from the plurality of data storage devices based at least in part on the determination that the each of the dirty data structures comprises the logical identifier.

6. The apparatus of claim 4 wherein the at least one enclosure controller is further configured:
to determine that the attempt to obtain the first stripe metadata page from the another of the plurality of metadata storage devices was successful; and
to copy the first stripe metadata page to the first metadata storage device based at least in part on the determination that the attempt to obtain the first stripe metadata page was successful.

7. The apparatus of claim 1 wherein the at least one enclosure controller is further configured:
to add an additional entry to the metadata journal for an attempted write of a second stripe metadata page to the first metadata storage device based at least in part on the first metadata storage device being in the hiccup state.

8. The apparatus of claim 7 wherein in response to an attempted read of the second stripe metadata page from the first metadata storage device while the first metadata storage device is in the hiccup state, the at least one enclosure controller is further configured to read the second stripe metadata page from another of the metadata storage devices.

9. The apparatus of claim 7 wherein the at least one enclosure controller is further configured:
to determine that a threshold criterion is met by the first metadata storage device;
to set the first metadata storage device to a healthy state based at least in part on the determination that the threshold criterion is met by the first metadata storage device; and
to resynchronize the first metadata storage device based at least in part on the determination that the threshold criterion is met by the first metadata storage device.

10. The apparatus of claim 9 wherein resynchronizing the first metadata storage device comprises:
for each entry corresponding to the first metadata storage device in the metadata journal:
reading a valid copy of the corresponding first stripe metadata page from another of the metadata storage devices;

writing the valid copy of the corresponding first stripe metadata page to the first metadata storage device; and invalidating the entry in the metadata journal.

11. A method comprising:

writing a first stripe metadata page to a plurality of metadata storage devices of a disk array enclosure, the first stripe metadata page corresponding to a stripe of data stored on a plurality of data storage devices of the disk array enclosure;

determining that the write of the first stripe metadata page failed for a first metadata storage device of the plurality of metadata storage devices;

adding an entry to a metadata journal stored in a cache of the disk array enclosure based at least in part on the determination that the write of the first stripe metadata page failed, the entry comprising an indication of the first metadata storage device and an indication of the stripe of data;

setting an indication in a data structure associated with the disk array enclosure that the first stripe metadata page for the stripe of data has not been written to the first metadata storage device; and setting the first metadata storage device to a hiccup state based at least in part on the determination that the write of the first stripe metadata page failed for the first metadata storage device;

wherein the method is implemented by at least one enclosure controller of the disk array enclosure.

12. The method of claim 11 wherein the method further comprises:

determining that the write of the first stripe metadata page succeeded for a second metadata storage device of the plurality of metadata storage devices;

determining that the metadata journal comprises an additional entry corresponding to the second metadata storage device, the additional entry comprising an indication of the second metadata storage device and an indication of the stripe of data; and invalidating the additional entry in the metadata journal based at least in part on the determination that the write of the first stripe metadata page succeeded for the second metadata storage device.

13. The method of claim 11 wherein the at least one enclosure controller comprises at least one processing device coupled to a memory, the memory comprising a dirty data structure associated with the first metadata storage device, the method further comprising adding an entry to the dirty data structure based at least in part on the determination that the write of the first stripe metadata page failed for the first metadata storage device, the entry added to the dirty data structure comprising a logical identifier corresponding to at least a portion of the stripe of data.

14. The method of claim 13 wherein the method further comprises:

receiving a read operation comprising the logical identifier;

determining that the dirty data structure associated with the first metadata storage device comprises the logical identifier; and attempting to obtain the first stripe metadata page from another of the plurality of metadata storage devices based at least in part on the determination that the dirty data structure associated with the first metadata storage device comprises the logical identifier.

15. The method of claim 14 wherein:

the memory comprises a plurality of dirty data structures each associated with a corresponding metadata storage device of the plurality of metadata storage devices;

the method further comprises:

maintaining a copy of the first stripe metadata page on the plurality of data storage devices;

determining that each of the dirty data structures comprises the logical identifier; and obtaining the first stripe metadata page from the plurality of data storage devices based at least in part on the determination that the each of the dirty data structures comprises the logical identifier.

16. The method of claim 14 wherein the method further comprises:

determining that the attempt to obtain the first stripe metadata page from the another of the plurality of metadata storage devices was successful; and copying the first stripe metadata page to the first metadata storage device based at least in part on the determination that the attempt to obtain the first stripe metadata page was successful.

17. The method of claim 11 further comprising:

adding an additional entry to the metadata journal for an attempted write of a second stripe metadata page to the first metadata storage device based at least in part on the first metadata storage device being in the hiccup state.

18. The method of claim 17 wherein in response to an attempted read of the second stripe metadata page from the first metadata storage device while the first metadata storage device is in the hiccup state, the method further comprises reading the second stripe metadata page from another of the metadata storage devices.

19. The method of claim 17 wherein the method further comprises:

determining that a threshold criterion is met by the first metadata storage device;

setting the first metadata storage device to a healthy state based at least in part on the determination that the threshold criterion is met by the first metadata storage device; and resynchronizing the first metadata storage device based at least in part on the determination that the threshold criterion is met by the first metadata storage device, the resynchronizing comprising:

for each entry corresponding to the first metadata storage device in the metadata journal:

reading a valid copy of the corresponding first stripe metadata page from another of the metadata storage devices;

writing the valid copy of the corresponding first stripe metadata page to the first metadata storage device; and invalidating the entry in the metadata journal.

20. A computer program product comprising a non-transitory processor-readable storage medium having stored therein program code of one or more software programs, the program code when executed by at least one enclosure controller of a disk array enclosure of a storage system, causes the at least one enclosure controller:

to write a first stripe metadata page to a plurality of metadata storage devices of the disk array enclosure, the first stripe metadata page corresponding to a stripe of data stored on a plurality of data storage devices of the disk array enclosure;

to determine that the write of the first stripe metadata page failed for a first metadata storage device of the plurality of metadata storage devices;

to add an entry to a metadata journal stored in a cache of the disk array enclosure based at least in part on the determination that the write of the first stripe metadata page failed, the entry comprising an indication of the metadata storage device and an indication of the stripe of data;

to set an indication in a data structure associated with the disk array enclosure that the first stripe metadata page for the stripe of data has not been written to the first metadata storage device; and to set the first metadata storage device to a hiccup state based at least in part on the determination that the write of the first stripe metadata page failed for the first metadata storage device.

* * * * *